Patented July 11, 1939

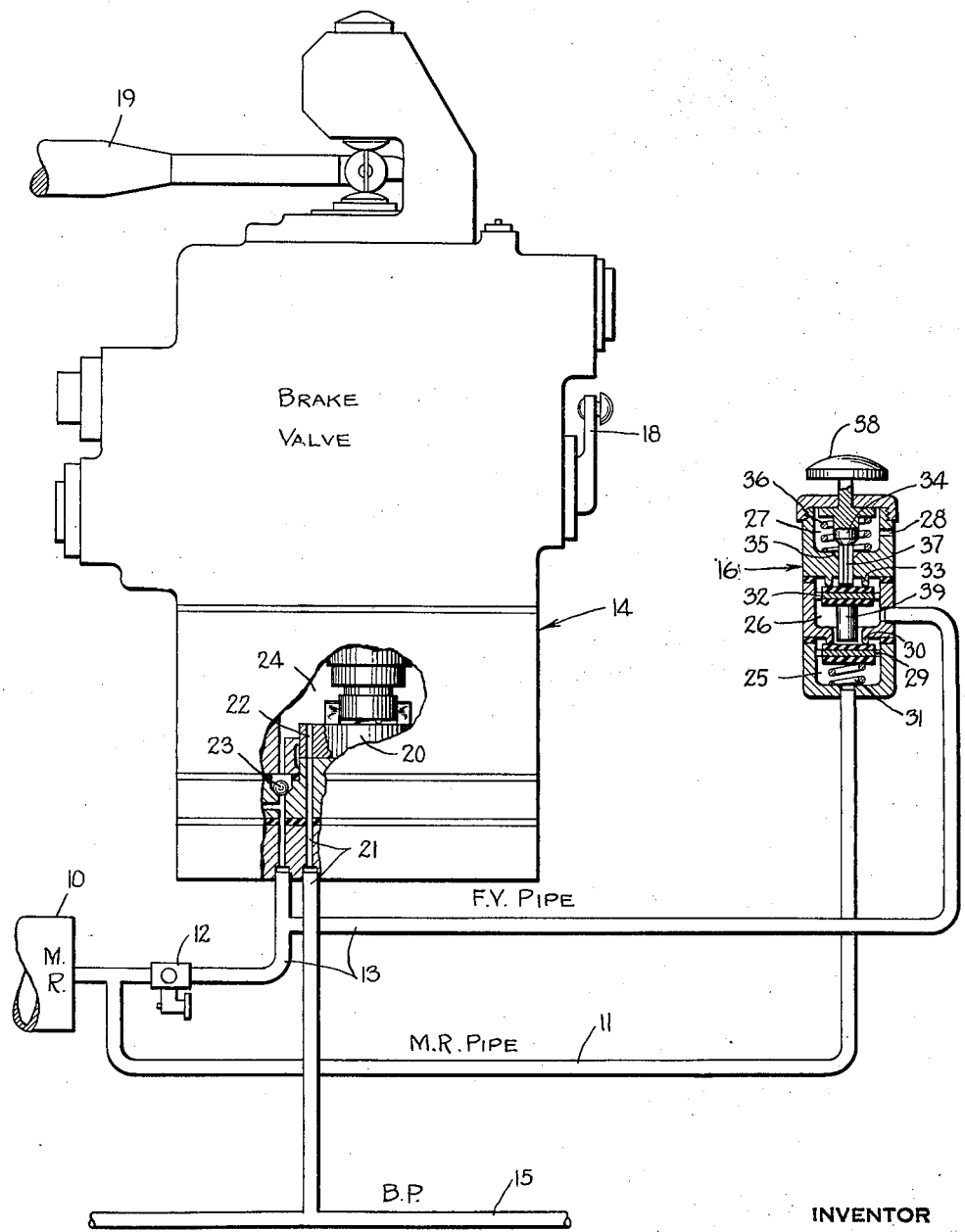

2,165,988

UNITED STATES PATENT OFFICE 2,165,988

FLUID PRESSURE BRAKE

Carlton D. Stewart, Wilkinsburg, Pa., assignor to The Westinghouse Air Brake Company, Wilmerding, Pa., a corporation of Pennsylvania Application August 18, 1937, Serial No. 159,678

4 Claims. (Cl. 303—66)

This invention relates to fluid pressure brakes, and more particularly to fluid pressure brakes intended for high speed passenger trains.

Brake equipments for modern high speed passenger trains generally include a straight air portion, for effecting applications of the brakes by straight air operation, and an automatic portion, for effecting applications of the brakes by automatic operation. The automatic portion includes a brake pipe which extends throughout the train and which is normally maintained charged to some predetermined pressure value, as for example seventy pounds (per sq. in.). When an automatic brake application is effected pressure in the brake pipe is reduced and the automatic valves on each car in the train respond to this pressure reduction to effect an application of the brakes on that car. When the brakes are to be released following such an application, the brake pipe is recharged and the pressure brought back to its normal value, whereupon the automatic valves on each car release the brakes.

In order that the brake pipe pressure shall be maintained charged to a substantially constant value when the brakes are released, a feed valve device, or other pressure regulating device, is employed. The function of this device is to deliver fluid under pressure from the main reservoir to the brake pipe, by way of an engineer's brake valve device, and maintain the brake pipe charged to a chosen pressure value against leakage or other pressure reducing tendencies. The setting of the feed valve device is usually much lower than the pressure maintained in the main reservoir. For example, if the brake pipe is normally charged to seventy pounds pressure, it is customary to maintain the main reservoir at from ninety to one hundred and five pounds pressure.

Now in trains comprising a relatively large number of cars, that is long trains, when the brake pipe is recharged to effect a release of the brakes following an automatic application, the pressure of the brake pipe at the head end of the train will rise faster than the pressure at the rear end of the train. This is particularly true if there happens to be appreciable leakage throughout the length of the brake pipe. As a consequence, if the automatic valves near the rear of the train are somewhat sluggish in responding to pressure differentials, a release of the brakes on the rear cars may not be effected and when the train is subsequently driven under power these brakes may remain applied, or at least partially applied, which as will be obvious, is an undesirable condition.

To avoid the possibility of failure of release of the brakes on the rear cars in a long train it is desirable that when recharging the brake pipe fluid at a higher pressure than feed valve pressure, as for example fluid at main reservoir pressure, should be supplied to the brake pipe, as it has been found that the higher pressure head produces a pressure wave which will rapidly travel the length of the brake pipe and be high enough in intensity to cause any sluggish valves on cars in the rear of the train to more promptly respond and move to release position. It is therefore desirable that some means be provided whereby the operator of the train may if he desires recharge the brake pipe with fluid at a higher pressure than obtainable from the feed valve device.

When the train is fairly short, charging of the brake pipe with fluid at a higher pressure than feed valve setting is generally unnecessary. Therefore, it is further desirable that the means which provides for recharging the brake pipe at higher than feed valve pressure be arranged so that it may be selected only at desired times; that is to say, when the power vehicle is hauling a long train it may be selected at the will of the operator, whereas when the power vehicle is hauling a short train the operator may disregard it entirely.

With the foregoing considerations in mind, it is a principal object of the present invention to provide a means which can be associated with already installed brake equipments, or added to new equipments as an independent feature, whereby the operator may at his option cause the brake pipe to be recharged with fluid at a pressure higher than the normal feed valve setting.

Other objects and advantages of the invention will be apparent from the following description, which is taken in connection with the single figure of the attached drawing, which illustrates in diagrammatic and schematic form an embodiment of the invention for a single car.

Referring now to this drawing, the parts there shown comprise a main reservoir 10, a main reservoir pipe 11, a feed valve device 12, a feed valve pipe 13, a brake valve device 14, a brake pipe 15, and a charging valve device 16.

The main reservoir 10 is connected in the usual manner to a compressor (not shown), and it will be assumed that the compressor maintains the main reservoir charged with fluid between pressures of ninety and one hundred and five pounds (per sq. in.). The feed valve device 12, which may be of conventional design and which will be so assumed, will be taken as adjusted to deliver fluid from the main reservoir to the feed valve pipe 13 at seventy pounds pressure.

Considering now the brake valve device 14, this device has been shown principally in outline form and is preferably of the type described and claimed in the copending application of Ellis E. Hewitt, Serial No. 105,659, filed October 15, 1936, which application is also owned by the assignee of the present application. It is not essential to the understanding of the present invention that the brake valve device be described in detail. All that is necessary for present purposes is to state that the brake valve device is conditionable for straight air operation or automatic operation by movement of a selector 18 to either a straight air or an automatic position.

When the selector is in the automatic position, brake valve handle 19 is conditioned to operate a rotary valve 20 to control communication between the feed valve pipe 13 and pipe and passage 21 leading to brake pipe 15, this communication being effected in the release position of the handle by way of port 22 in the rotary valve. When the handle 19 is in automatic service application position, a restricted cavity (not shown) in the rotary valve 20 connects the pipe and passage 21 to an atmospheric port to reduce brake pipe pressure at a service rate, and when the handle 19 is in an emergency application position an unrestricted cavity (also not shown) connects the pipe and passage 21 to the exhaust port to reduce brake pipe pressure at an emergency rate.

When the handle 19 is returned to the release position communication is reestablished between the pipe and passage 21 and the feed valve pipe 13. A check valve 23 is provided between the feed valve pipe 13 and chamber 24 in which the rotary valve 20 is disposed, for the purpose of preventing fluctuations of pressure in the brake pipe, while the charging communication is open, when the brake valve device is conditioned for straight air operation and fluid under pressure is supplied from the feed valve pipe 13 to a control pipe to effect a straight air application of the brakes. This feature is, however, of no consequence with respect to the present invention.

Considering now the charging valve device 16, this device is embodied in a casing provided with three chambers 25, 26 and 27. Chamber 25 is connected to the main reservoir pipe 11, and chamber 26 is connected to the feed valve pipe 13, while the chamber 27 is always open to the atmosphere by way of port 28.

Disposed in the chamber 25 is a valve 29 which is normally held upon a seat 30 by spring 31. This valve controls communication between chambers 25 and 26.

Disposed in chamber 26 is a valve 32 which has a stem 33 and which is normally held upon a seat 33 by the pressure of fluid in chamber 26. The valves 29 and 32 are of usual disc construction with peripheral lugs to guide movement of the valve in the enclosing chamber.

Disposed in the chamber 27 is a valve 34 which is urged away from a seat 35 by spring 36. This valve is provided with a fluted stem 37 which engages the upper surface of the aforementioned valve 32. The valve 34 is also attached to a button 38, which is adapted to be depressed manually by an operator.

When the button 38 is free of pressure, the several valves described are positioned as illustrated. When the button 38 is depressed by having pressure manually applied thereto, the valve 34 will seat upon seat 35 and at the same time the fluted stem 37 engages the valve 32 and unseats it. As the valve 32 unseats its stem 39 engages the valve 29 and unseats it. For this position of the valves the main reservoir pipe 11 will be connected to the feed valve pipe 13, while any tendency of fluid under pressure to leak to the atmosphere is prevented by the seating of the valve 34.

When pressure applied to the push button 38 is released, spring 31 will seat the valve 29 while at the same time urging the valve 32 toward its seat. Seating of the valve 29 will close communication between the main reservoir pipe 11 and feed valve pipe 13, while seating of the valve 32 will prevent any possible leakage of fluid from the feed valve pipe 13 to the atmosphere.

It will be observed that the pressure of fluid in the chamber 25 assists the spring 31 in holding the valve 29 seated, while the pressure of fluid in chamber 26 will always hold the valve 32 seated due to the fact that the area within the seat rib 33 is at atmospheric pressure when the valve 34 is unseated. The spring 36, of course, holds the valve 34 unseated as well as holding the button 38 in its upper position.

While the brake system with which the invention is associated has been shown in fragmentary form only, it is to be understood that I contemplate the adaptation of the invention to brake systems of the type illustrated in the copending application of Ellis E. Hewitt, Serial No. 741,063, filed August 23, 1934, and also to brake systems of the type illustrated in Instruction Pamphlet No. 5,064, sup. 3, issued by The Westinghouse Air Brake Company, Pittsburgh, Pa., assignee of the present application and those herein referred to.

In the operation of brake systems with which the invention is associated, when the brakes are released the brake valve handle 19 is maintained in a position so that communication is established between the feed valve pipe 13 and the brake pipe 15, as illustrated in the drawing. When an automatic application of the brakes is to be effected the selector 18 is positioned in the automatic position. The brake valve handle 19 is then turned to either the service or emergency position, depending upon whether a service or an emergency application is desired, whereupon communication between the brake pipe and feed valve pipe is closed, and the brake pipe is vented to the atmosphere. As is well understood, this results in an automatic application of the brakes.

When it is desired to release the brakes the brake valve handle 19 is returned to the release position, where the communication between the feed valve pipe and main reservoir pipe, as illustrated, is re-established.

Now if the train is a long one and in the judgment of the operator the brake pipe will not be charged rapidly enough by fluid at feed valve pressure to insure that the automatic devices through the train will move to release position, the operator then depresses the button 38, thereby connecting the main reservoir pipe 11 to the brake pipe 15. It is to be observed however that this communication will not be established unless the brake valve handle 19 is in the release position. That is, the brake pipe cannot be charged with fluid at main reservoir pressure unless the brake valve handle is in the normal release position. This prevents an accidental release of the brakes by accidentally pressing the button 38 at a time when the brake valve handle 19 is in application position.

The operator holds the button 38 depressed until by watching the gages in the cab it is observed that brake pipe pressure is rising rapidly and is approaching its normal or fully charged value. He then relases pressure on the button 38 and permits the brake pipe to be finally recharged to its normal value by fluid delivered by the feed valve device 12. The wave of rising brake pipe pressure, due to charging with fluid at main reservoir pressure, will cause the automatic valve devices to move to release position, where they will remain as brake pipe pressure rises to its normally charged value.

Thus the valve device 16 provides a means which may be attached to a previously installed equipment, or added to new equipments as a separate device, for insuring the release of the automatic valves throughout the train, and which at the same time is selective according to the judgment of the operator.

While the invention has been illustrated in a simple and specific form, it is to be understood as comprising all forms included within the scope and spirit of the appended claims.

Having now described my invention, what I claim as new and desire to secure by Letters Patent, is:

1. In a vehicle brake system, in combination, a main reservoir, a brake pipe, a feed valve device connected to said main reservoir and adapted to supply fluid therefrom at a pressure dependent upon the adjustment thereof, a brake valve device operable in a release position to supply fluid under pressure from said feed valve device to said brake pipe, and separate valve means operable to supply fluid at main reservoir pressure to said brake pipe only when said brake valve device is in release position.

2. In a vehicle brake system, in combination, a main reservoir, a feed valve device connected to said main reservoir and adapted to deliver fluid at a pressure less than main reservoir pressure, a brake valve device operable to establish communication between said feed valve device and said brake pipe, and a separate valve device having an element operable so long as pressure is manually applied thereto to establish communication between said main reservoir and said brake pipe only when said brake valve device is in release position.

3. In a vehicle brake system, in combination, a main reservoir, a brake pipe, means providing for a communication between said main reservoir and said brake pipe, a feed valve device and an engineer's brake valve device arranged in series in said communication, and a valve device having an element adapted so long as held depressed by pressure manually applied thereto to establish a communication between said main reservoir and said brake valve device which by-passes said feed valve device.

4. In a charging valve device, in combination, a normally seated valve operable when unseated to establish communication between two connected pipes, a second normally seated valve operable when seated to close communication between one of said pipes and a communication leading to the atmosphere, and when unseated to open said communication to the atmosphere, a third normally unseated valve adapted when seated to close said communication to the atmosphere, and an element adapted to be depressed by force manually applied thereto for unseating said normally seated valves and for seating said normally unseated valve.

CARLTON D. STEWART.